July 10, 1956     H. R. A. HANSEN ET AL     2,754,463
CURRENT AND TORQUE LIMIT CIRCUIT FOR ELECTRIC MOTOR
Filed Oct. 1, 1954     2 Sheets-Sheet 2
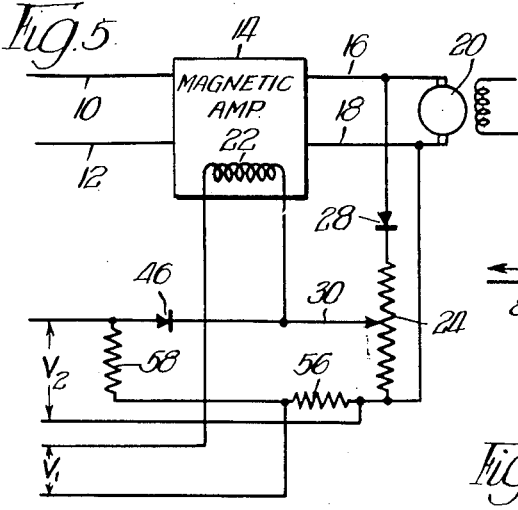
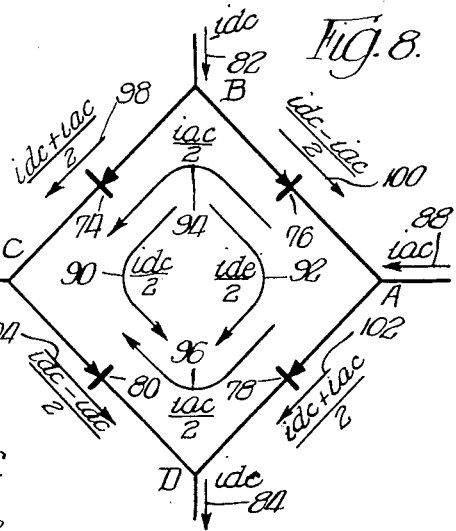
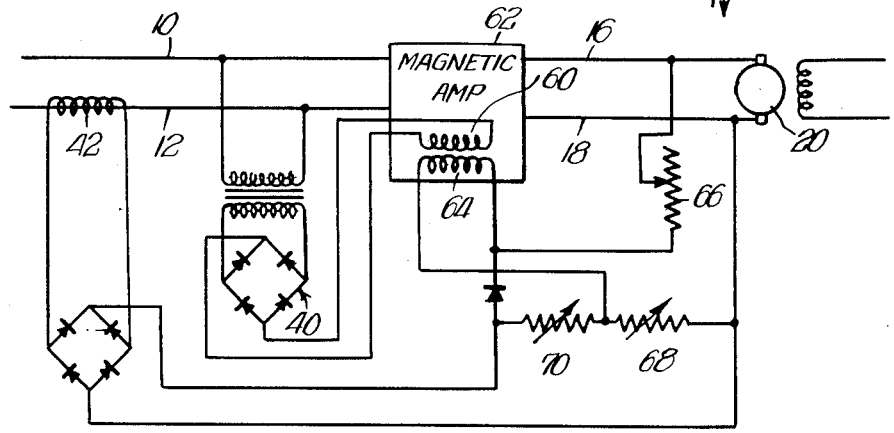
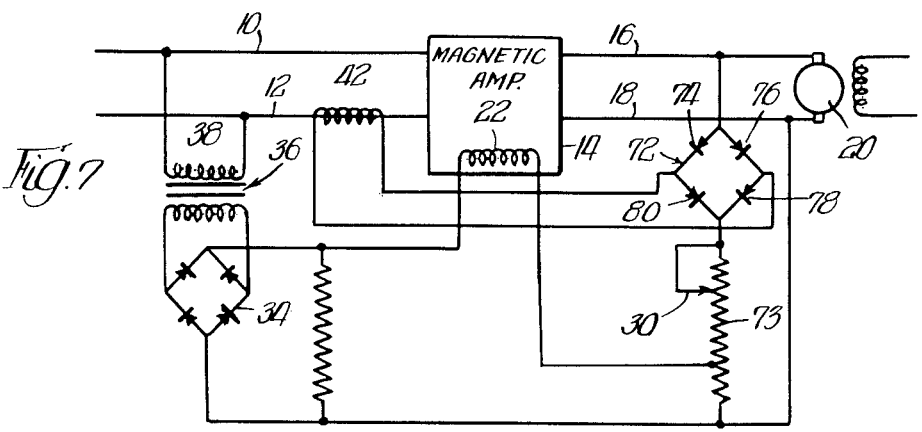
INVENTORS.
Hans Richard Ansgar Hansen,
Elmer G. Conger,
BY Wilkinson, Huxley,
Byron + Hume
attys.

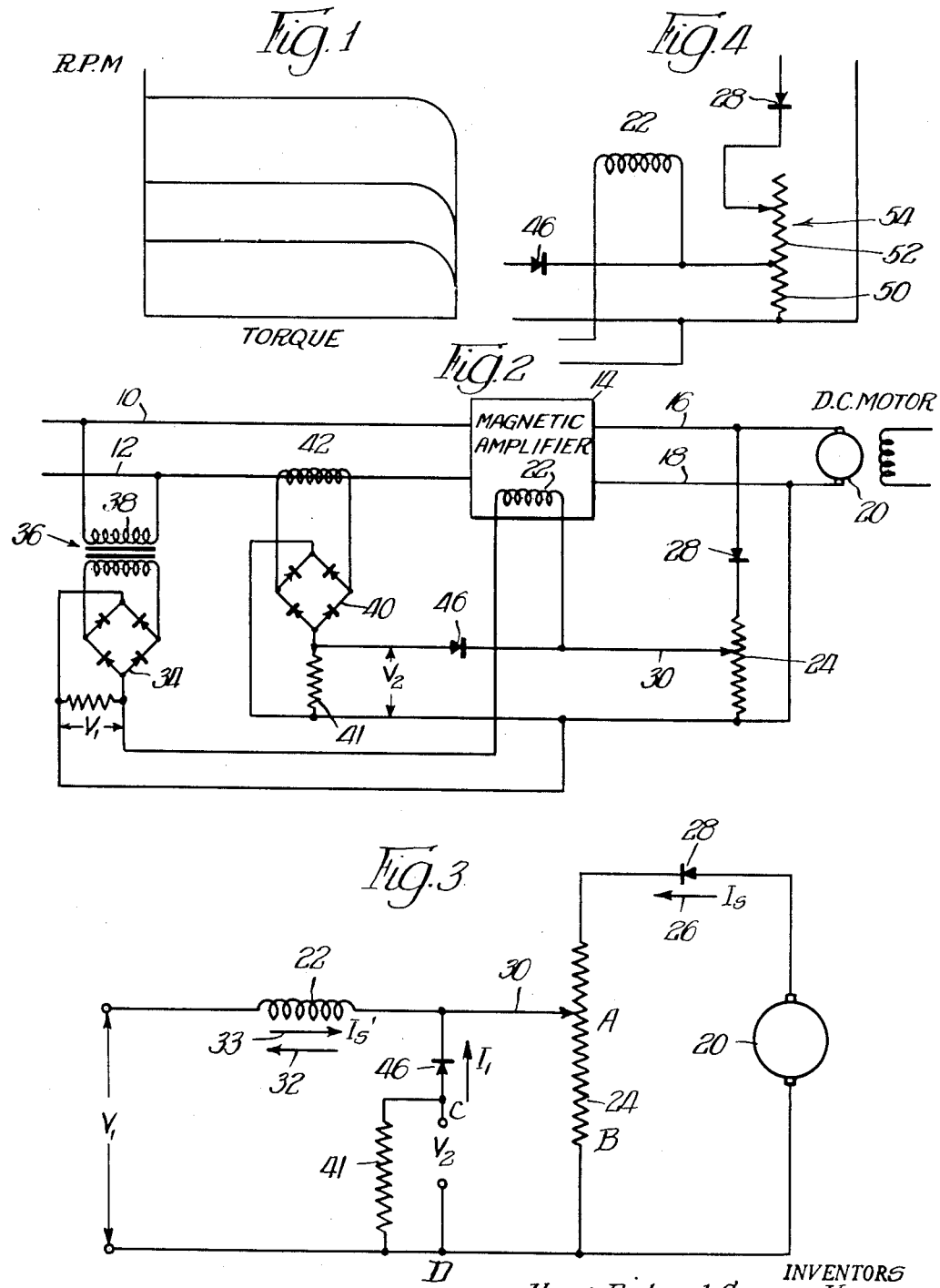

United States Patent Office 2,754,463
Patented July 10, 1956

2,754,463

CURRENT AND TORQUE LIMIT CIRCUIT FOR ELECTRIC MOTOR

Hans Richard Ansgar Hansen and Elmer G. Conger, Cudahy, Wis., assignors to The Louis Allis Co., Milwaukee, Wis., a corporation of Wisconsin Application October 1, 1954, Serial No. 459,782

9 Claims. (Cl. 318—308)

This invention relates to a current and torque limit circuit for a D. C. electric motor, and more particularly to such a circuit which is adapted to form a part of an adjustable speed drive for operation on A. C. power, utilizing a magnetic amplifier control circuit for a D. C. electric motor. This application discloses a circuit which is an improvement on the type of adjustable speed drive circuit disclosed in application Serial No. 385,986, filed October 14, 1953.

The ultimate purpose of an adjustable speed control circuit for an electric motor is to maintain the controlled motor at a selected speed in spite of variations in the load. It is likewise desirable to have an automatically operable upper limit for the current or torque at which the speed of the motor will be reduced rather than held constant.

It is an object of this invention to provide an adjustable speed drive of the character described in which the speed of the controlled motor is caused to drop off almost vertically when a certain selected value of torque or current is reached.

Another object is to provide speed control circuit of the character described in which speed drop compensation may also be provided.

Still another object is to provide such an adjustable speed drive circuit which is relatively low in cost and simple in both construction and operation.

Further objects and advantages of this invention will become evident as the description proceeds and from an examination of the accompanying drawings which illustrate several embodiments of the invention and in which similar numerals refer to similar components throughout the several views.

In the drawings:

Figure 1 is a graphical representation of the type of control achieved by the use of circuits embodying the present invention with the speed of the controlled motor being plotted against the torque.

Figure 2 is a circuit diagram illustrating one embodiment of the invention, several of the elements thereof being shown more or less diagrammatically.

Figure 3 is an equivalent circuit of the circuit shown in Figure 2.

Figure 4 is a circuit diagram of a fragmentary portion of an alternative form of circuit showing an alternative connection of the speed potentiometer.

Figure 5 is a circuit diagram illustrating a modification of the circuit shown in Figure 2, providing for speed drop compensation.

Figure 6 is a circuit diagram illustrating an embodiment of the invention employing a magnetic comparison rather than an electric comparison, some of the elements thereof being shown more or less diagrammatically.

Figure 7 is a circuit diagram illustrating still another embodiment of the invention.

Figure 8 is an enlarged circuit diagram of one of the rectifier elements shown in Figure 7.

Referring now to Figures 1 and 2, a form of circuit is shown in Figure 2 which will give the type of control illustrated in Figure 1. Lines 10 and 12 represent a source of line voltage which may be a 220 volt supply at 60 cycles per second. A magnetic amplifier is indicated generally by the numeral 14, the output of which is fed through the lines 16 and 18 to the armature of D. C. motor 20. A control winding 22 is provided in the magnetic amplifier and under normal conditions of operation there will be a flow of current in one direction or the other in the winding 22 since the voltages impressed thereon will normally not be exactly equal in magnitude. A feed back to the amplifier control winding 22 is supplied from the armature of the D. C. motor 20 through a speed-setting potentiometer 24.

As shown in the equivalent circuit illustrated in Figure 3, the back E. M. F. of the motor 20 creates a current Is, indicated by the arrow 26. This current is proportional to the speed of the motor and flows through the rectifier 28 and the speed setting potentiometer 24. The movable arm 30 of the potentiometer 24 will apply a selected voltage to the control winding 22. The regulation of the selected speed of the motor 20 is normally accomplished by balancing a reference voltage obtained from the full wave bridge rectifier 34, shown in Figure 1, against the portion of the voltage which appears across the resistance of the potentiometer 24 selected by the arm 30. The transformer 36, the primary 38 of which is connected to the supply lines 10 and 12, supplies the input voltage to the rectifier 34. This type of circuit arrangement is more fully disclosed in the co-pending application referred to above. The reference voltage in the equivalent circuit illustrated in Figure 3 is represented by the letter $V_1$.

More specifically, if the arm 30 on the potentiometer is set for a particular speed, for example 1200 R. P. M., and if the load is decreased so that the speed of the motor would tend to increase, an increase in the speed of the motor would in turn cause an increase in the back E. M. F. This in turn would result in a higher voltage between the points A and B (Figure 3) on the speed potentiometer 24, which would tend to be greater than the reference voltage and would therefore tend to cause a current Is' to flow in the control winding 22 in the direction of the arrow 32. The winding 22 may be so designed that a flow of current in this direction will cause a decrease in the output of the magnetic amplifier. This decrease in the output of the amplifier will in turn cause the voltage applied to the armature of the motor to decrease and the speed of the motor will therefore be brought back to a point at which the voltage across the points A and B is once again equal to the reference voltage.

Likewise, if the load is increased so that the speed of the motor would tend to decrease, the back E. M. F. will drop. The reference voltage will then tend to cause a current to flow in the control winding 22 in the direction of the arrow 33 which will increase the output of the amplifier and thus the speed of the motor.

At the same time this type of speed regulation is being carried out, a voltage $V_2$ is being applied between the points C and D (Figure 3) by the rectifier 40 and the resistor 41. This rectifier 40 and resistor 41 are a source of D. C. voltage proportional to the armature current, the rectifier input being obtained from the secondary of the current transformer 42, the primary of which is in series with the supply line 12. The voltage $V_2$ so applied results in a current $I_L$, through the rectifier 40 when $V_2$ is greater than the voltage across AB. No current will flow, however, when the voltage $V_2$ is less than the voltage across AB. When $I_L$ begins to flow in the control winding 22, in the direction of arrow 32, this immediately causes the output of the magnetic amplifier to decrease and results in a corresponding decrease in the speed in the motor. This is the opposite of what would occur when $I_L$ has not yet taken over control, since an increase in $I_L$ would normally be coupled with a decrease in the back E. M. F. and in $I_{S'}$, which, as stated above, causes an increase in the speed of the motor. Once the current $I_L$ has started to flow and therefore has taken over control from the current $I_{S'}$, any continuing increase in the torque will cause an increase in $I_L$ and an immediate continuing decrease in the speed of the motor. This effect is graphically represented in Figure 1 where a very abrupt falling off of the speed of the motor is illustrated, after the torque limit has been reached.

Rectifier 46 may be said to be biased by the voltage across AB so that it is an application of the biased rectifier principle which is utilized in obtaining the form of shifting control just described. Obviously when the voltage $V_2$ becomes greater than the voltage applied across AB the resultant current flow $I_L$ in the control winding 22 in the direction of the arrow 32 will represent an assumption of control by the voltage $V_2$. It is for this reason that the control curves shown in Figure 1 have the abrupt termination point.

As shown in Figure 4, an alternative connection of the speed potentiometer may be utilized in which the potentiometer acts like a constant load current thus increasing the accuracy at low speeds. The resistance in the form shown in Figure 2 results in a non-linear change of speed, which is desirable for certain applications whereas the resistance in the form shown in Figure 4 is proportional to the voltage resulting in a linear change of speed.

Figure 5 is an improvement over the forms of circuits shown in Figures 2 and 4 in that an IR drop resistor 56 has been added which permits speed drop compensation using essentially the same circuit as previously utilized. In addition, the resistance 58 is provided, which together with resistance 56 corresponds in function to previously mentioned resistance 41 shown in Figure 2.

The forms of control circuit discussed so far utilize an electric comparison of the reference and feed back voltages, whereas the form of circuit shown in Figure 6 discloses a circuit in which a magnetic comparison is utilized. A reference voltage is fed to control winding 60 of the magnetic amplifier 62 while the oppositely connected control winding 64 is supplied with a voltage from the speed potentiometer 66 and the IR compensation variable resistor 68, under normal circumstances. When the armature current limit is reached, however, the voltage from the resistor 70 takes over and is supplied to the control winding 64.

Yet another embodiment of the invention is shown in Figure 7, wherein a biased rectifier control circuit is disclosed, utilizing a current bias principle rather than a voltage bias principle. The circuit is generally similar to that shown in Figure 2, magnetic amplifier 14 being provided along with the full wave bridge rectifier 34, as a reference voltage source. A second full wave bridge rectifier 72 is disposed in series with the resistance 73 across the armature of the direct current motor 20 and has the individual rectifiers 74, 76, 78 and 80 therein. The resistance 73 is comparable to the resistance 52 shown in Figure 4, and the movable arm 30 is adapted to apply a selected voltage to the control winding 22 in substantially the same fashion as previously described in connection with the circuit shown in Figure 4. One side of the full wave rectifier 72 is connected to the output of the current transformer 42, the primary of which is in series with the supply line 12. This current transformer 42 provides an A. C. current which is proportional to the armature current, while a D. C. current is provided from the armature 20 which is applied to the opposite side of the rectifier 72.

As shown in Figure 8, the manner in which the supplied currents flow in the rectifier 72 is somewhat complex, since a D. C. and A. C. current source are both present. The various currents are indicated by the arrows 82 through 96. The instantaneous value of the A. C. current supplied from the current transformer 42 may be designated as $i_{ac}$ and the value of direct current at that same instant may be designated $i_{dc}$. If the currents in the four legs of the rectifier 72 are metered they will be found to be as shown in Figure 8. In other words the current $i_{ac}$ (arrows 86 and 88) divides at terminal A, one-half flowing from A to B to C (arrow 94) through the rectifiers 76 and 74, and the other half from A to D to C (arrow 96) through the rectifier 78 and 80. The current $i_{dc}$ (arrows 82 and 84) divides at point B, so that one-half flows from B to C to D while the other half flows from B to A to D. Thus, it can be seen that $i_{ac}/2$ and $i_{dc}/2$ flow through legs AB and DC in opposite directions.

Thus, one can regard the rectifier elements as valves, which the current $i_{dc}$ opens when greater than $i_{ac}$ so that they form a short circuited path for $i_{ac}$. Whenever $i_{ac}$ is greater than $i_{dc}$, however, the current $i_{ac}$ closes the valves for $i_{dc}$ and an A. C. component appears across the resistance 73. Therefore, so long as the peak value of $i_{ac}$ is less than or equal to $i_{dc}$, then no A. C. component will be rectified and allowed to flow through the resistance 73. However, if the peak value of $i_{ac}$ becomes greater than $i_{dc}$ where $i_{dc}$ is a smooth D. C., then the average value of the load current will be equal to $i_{dc}$ plus the average value of that portion of the A. C. current which exceeds $i_{dc}$.

In other words, if the direct current is greater than the alternating current, then the direct current will control the magnetic amplifier 14, but when the alternating current becomes greater, it will take over control thereof.

Although the embodiment shown in Figure 7 utilizes electric comparison of the control voltages, the same circuit can be readily modified for magnetic comparison. To do so the output of rectifier network 34 can be applied to a separate control winding similar to the winding 60 in Figure 6, rather than to the winding 22.

In the drawing and specification, there have been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

We claim:

1. A combination speed regulator and current and torque limiting circuit for an electric motor comprising a magnetic amplifier with an alternating current input and a direct current output; control winding means in said magnetic amplifier; means connecting the output of said magnetic amplifier across the armature of said motor; means for applying a voltage produced by the back E. M. F. from said motor armature to said control winding means; means providing a reference voltage connected to said control winding means in opposition to said first named voltage; means for producing an E. M. F. proportional to the armature current; and a biased rectifier means connected to said control winding means, said rectifier being biased by said back E. M. F. with respect to the E. M. F. proportional to the armature current and being connected to said control winding means so as to apply thereto a voltage produced by said back E. M. F. when said E. M. F. proportional to said armature current is less than said back E. M. F. and a voltage produced by said E. M. F. proportional to said armature current when the latter E. M. F. is the larger.

2. In a combination speed regulator and current and torque limiting circuit for an electric motor having a magnetic amplifier with a control winding means, means for producing an E. M. F. proportional to the armature current, rectifier means biased by at least a portion of the back E. M. F. of said motor armature with respect to said E. M. F. proportional to the armature current, said rectifier means being connected to said control winding means so that at least a portion of said back E. M. F. is normally applied to said control winding means but only said E. M. F. proportional to said armature current is applied thereto when the latter E. M. F. is greater.

3. A combination speed regulator and current and torque limiting circuit for an electric motor comprising a magnetic amplifier with an alternating current input and a direct current output; control winding means in said magnetic amplifier; means connecting the output of said magnetic amplifier across the armature of said motor, resistance means connected in parallel with said armature; means for connecting a selected variable portion of said resistance means in series with said control winding means; means providing a reference voltage connected in series with said control winding means so that said reference voltage is applied thereto in opposition to the voltage applied thereto from said variable portion of said resistance means; voltage supply means for producing a voltage proportional to the armature current; and a biased rectifier means connected in series with said voltage supply means, said biased rectifier means and said voltage supply means being connected in parallel with said variable portion of said resistance means.

4. A combination speed regulator and current and torque limiting circuit for an electric motor comprising a magnetic amplifier with an alternating current input and a direct current output; control winding means in said magnetic amplifier; means connecting the output of said magnetic amplifier across the armature of said motor; resistance means connected in parallel with the armature of said motor; means for connecting a selected variable portion of said resistance means to said control winding; means providing a reference voltage connected to said control winding means; voltage supply means for producing a voltage proportional to the armature current; and a biased rectifier means connected in series with said voltage supply means, said biased rectifier means and said voltage supply means being connected in parallel with said selected portion of said resistance means.

5. A current and torque limiting circuit for an electric motor having a speed regulator circuit including a magnetic amplifier having control winding means comprising a biased rectifier; a potentiometer, the resistance of which is disposed across the armature of said motor; a source of reference voltage connected in series with said control winding, and a selected variable portion of said resistance a source of voltage proportional to the load on said motor connected in series with said biased rectifier, said rectifier and said source being connected in parallel with said variable portion of said resistance of said potentiometer, so that a voltage from said resistance is normally applied to said control winding, but said voltage proportional to the load on said motor is applied thereto when it becomes larger than the voltage from said resistance.

6. A combination speed regulator and current and torque limiting circuit for an electric motor comprising a magnetic amplifier with an alternating current input and a direct current output; control winding means in said magnetic amplifier; means for producing an E. M. F. proportional to the armature current, rectifier means biased by at least a portion of the back E. M. F. of said motor armature with respect to said E. M. F. proportional to the armature current, said rectifier means being connected to said control winding means so that at least a portion of said back E. M. F. is normally applied to said control winding means but only said E. M. F. proportional to said armature current is applied thereto when the latter E. M. F. is greater.

7. A combination speed regulator and current and torque limiting circuit for an electric motor comprising a magnetic amplifier with an alternating current input and a direct current output; control winding means in said magnetic amplifier; means connecting the output of said magnetic amplifier across the armature of said motor, resistance means connected in parallel with said armature; means for connecting a selected variable portion of said resistance means in series with said control winding means; means providing a reference voltage connected in series with said control winding means so that said reference voltage is applied thereto in opposition to the voltage applied thereto from said variable portion of said resistance means; means for producing an E. M. F. proportional to the armature current, and a full wave bridge rectifier having one side thereof connected across said last named means, the other side being connected in series with said resistance means.

8. In a combination speed regulator and current and torque limiting circuit for an electric motor having a magnetic amplifier with a control winding means, a full wave bridge rectifier, a resistance connected in series with one side of said rectifier, across the armature of said motor, means for producing an alternating current proportional to the armature current connected across the other side of said rectifier so as to produce a current flow through said resistor when the current applied from said armature to said first named side of said rectifier is less than the current applied to said other side of said rectifier by said means for producing a current proportional to the armature current.

9. A combination speed regulator and current and torque limiting circuit for an electric motor comprising a magnetic amplifier with an alternating current input and a direct current output; means connecting the output of said magnetic amplifier across the armature of said motor; resistance means connected in parallel with the armature of said motor; a control winding in said magnetic amplifier; means for connecting a selected variable portion of said resistance means to said control winding; a second control winding in said magnetic amplifier; means providing a reference voltage connected to said second control winding; voltage supply means for producing a voltage proportional to the armature current; and a biased rectifier means connected in series with said voltage supply means, said biased rectifier means and said voltage supply means being connected in parallel with said selected portion of said resistance means.

No references cited.